J. P. ZELLER.
Grain Drill.
No. 61,375. Patented Jan. 22, 1867.
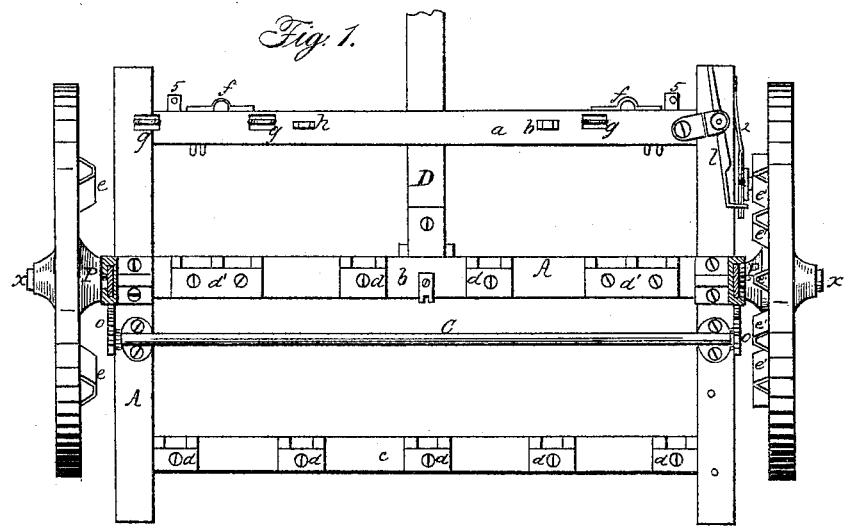
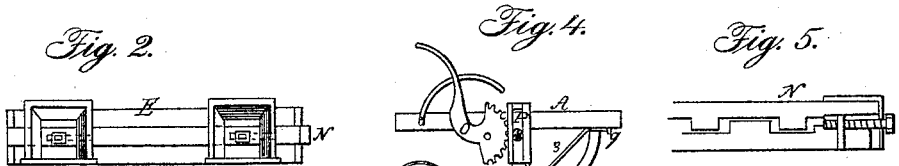
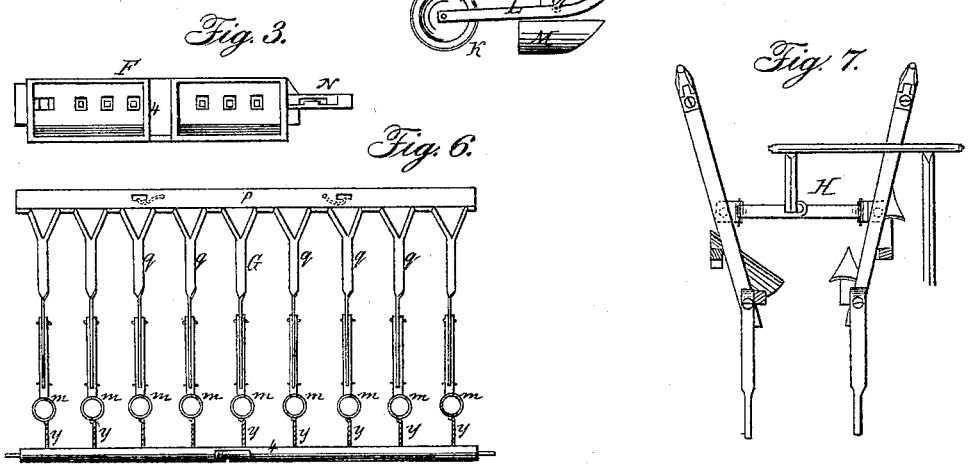
Witnesses:
Charles Alexander
A. A. Yeatman
Inventor:
John P. Zeller
per
Alexander A. Mason
attorney

United States Patent Office.

JOHN P. ZELLER, OF BOURBON, INDIANA.

Letters Patent No. 61,375, dated January 22, 1867.

---

IMPROVEMENT IN SEED-DRILLS AND CULTIVATOR COMBINED.

---

The Schedule referred to in these Letters Patent and making part of the same.

---

TO ALL WHOM IT MAY CONCERN:

Be it known that I, JOHN P. ZELLER, of Bourbon, in the county of Marshall, and in the State of Indiana, have invented certain new and useful Improvements in "Seed-Drills and Cultivators;" and do hereby declare that the following is a full, clear, and exact description thereof, reference being had to the accompanying drawings, and the letters of reference marked thereon, making a part of this specification.

Figure 1 represents an inverted plan view of the frame.

Figure 2, the corn-hopper.

Figure 3, the seed-box.

Figure 4, a view of the apparatus on end of the frame, near the hub of each wheel, for elevating or depressing the frame; also showing a side view of the shoe and roller in planting corn.

Figure 5, a view of the end of the seeder placed in the hoppers.

Figure 6, the detachable arrangement for drilling and planting the seed, with adjustable arms and boots.

Figure 7, the detachable corn cultivator.

Figure 8, a plan view, showing construction of the roller covering corn; and

Figure 9, the construction of shovel for cultivating.

In the annexed drawings, A represents the frame, which is usually made of wood, and of five distinct pieces of scantling, the parts $a$ $b$ and $c$ being connected by a piece at each end, in the form shown in fig. 1. B B are two wheels attached to the said frame. The inner faces of these wheels are provided with corrugated metal plates, which are placed about one-half the distance between the hub and tire of said wheels. The said corrugations $e'$ on wheel B' are made closer or nearer together than those, $e$, on wheel B. The objects of these corrugations are to operate the seeders in the bottom of the hoppers. Secured upon the frame is a double hinge, $z$, which is provided with a small friction-roller, and extends just beyond the side of the frame to fit against the corrugations. Attached to the bottom of the hinge is a small lever, pivoted at its centre to the frame $l$, and to one end of which is connected the seeder. When the wheel revolves it will thus be seen that the corrugations striking the small friction-roller will depress the hinge, which is again thrown outwards by a small spring, 2, and the seeder passed back and forth in its box. Whenever small seed are to be planted the wheel B' is used, but when larger seed (such as corn) are to be sown, the wheel B is used against the hinge $z$ instead of wheel B'. This is done merely by taking wheels from their axles or by transferring the gear apparatus to the side of the frame desired. The axles $x$, which connect the wheels, are but slightly longer than the width of the hubs. Each wheel has an independent axle, which is stationarily secured to an upright metal bar with cogs on one side, P, and which sets in a slide on the side of the frame. C represents a horizontal shaft, having a cog-segment, O, at each end, both of which mesh into the sliding axle-bars P. One of the cog-segments has an extended handle, by which means the frame A is lowered or raised. L represents the drag, with shoe M and roller K. This drag is connected to the frame by means of hooks on the curved ends, (which are made somewhat in form of the runners of a sleigh,) which hooks catch in the loops $g$ $g$, on the under side of frame A, and braced by the rod 3. The shoe M is of metal, and made in the form of the bow of a boat, while the roller K is concave in the centre. This drag, which is provided with shoe and roller, is used for opening and closing the ground when planting corn. A drag-shoe and roller are used under the frame, (one,) each side of the tongue D, and the hopper E, with seeder N, is placed upon the top of frame A, in a position so that the corn will drop between the shoe and roller. The shoe opens the ground, the corn is dropped and covered by the roller (with concave centre) which forms a ridge wherever it has passed. The seeder N, which I use, is made of two pieces of wood or metal, cut out as shown, placed together, and provided with a male and female screw (fig. 5) at one end, by which means the size of the openings, formed by the two coming together, is regulated to suit the size of the seed to be planted. F represents the seed-hopper, which can either be used as a broadcast sower or for drilling the seed in the ordinary way. This hopper, when used for a broadcast sower, is placed between the two side pieces in front of the frame, so that the tongue passes between the opening 4, made for that purpose, and the metal strips 5 5 pass into and connect it thereto by means of small pins. When placed thus the lever $l$ is passed into the loop in the seeder and the seed scatter through the cups in the bottom of the hopper. When this hopper is used in drilling it is placed in the rear end of the frame, so that its cups will be directly above the boots in the seed-drilling device G. The seed-drilling attachment is composed of a metal bar, $p$, a series of metal arms, $q$, the boots or seed pipes $m$, which are secured at the ends of each arm, and a horizontal bar, $t$, which is connected to the boots by a cord or chain leading from each boot, $y$. This device is attached to the under side of the frame by means of small openings in the bar $p$, which envelop metal studs $h\ h$, with small holes, in front piece $a$ of frame A, where pins pass through, and by placing the bar $t$ (by means of its axis) into openings in the ends of the cross-pieces of frame A. By means of the above bar $t$ and lever the boots are regulated to enter the depth of ground desired. H represents the corn-cultivator, which is provided with suitable handles, beams, and shovels, and connected to the frame by a frame of three pieces (as shown) extended above the cross-beams connecting the plough-beams, and swivels at the extreme end of the main beams, which pass into loops $f\ f$ on front piece $a$ of frame A. This cultivator is pivoted in such a way that it can be easily handled by the operator to evade stumps or other obstructions in the ground, and has a double shovel at one side, so it may scrape instead of cover the earth if so desired. I represents the construction of shovel used in cultivating ordinary vegetables or grain. One of these shovels is attached to each of the hinges $d$ upon frame A by means of a plate, $n$, at their top for a pin to pass.

Having thus fully described my invention, what I claim as new, and desire to secure by Letters Patent, is—

1. The frame A, constructed as described, with the hinges $d$, loops $g\ g$, studs $h\ h$, loops $f\ f$, studs 5 5, and tongue D, in the manner and for the purposes herein fully set forth.

2. The wheels B and B′, with corrugations upon their inner faces, and connected to the frame by the short axles, cog bars P, and metal slides, in the manner and for the purposes specified.

3. The arrangement of the shaft C with cog-segments O O, which mesh into the cog-bars P P, and used for elevating or depressing the frame A, in the manner as set forth.

4. The drag L, with shoe M and roller, constructed as set forth, and used with the frame A, as specified.

5. The arrangement of the detachable drilling device G, constructed as specified, and used in combination with the frame, as specified.

6. The corn-cultivator attachment H, when used with the frame A, as set forth.

In testimony that I claim the foregoing I have hereunto set my hand and seal this 20th day of October, 1866.

JOHN P. ZELLER.

Witnesses:
　C. M. ALEXANDER,
　J. W. MURRAY.